Oct. 25, 1955   E. C. LEVINTHAL   2,721,970
METHOD AND MEANS FOR IDENTIFYING SUBSTANCES
Filed Jan. 30, 1952
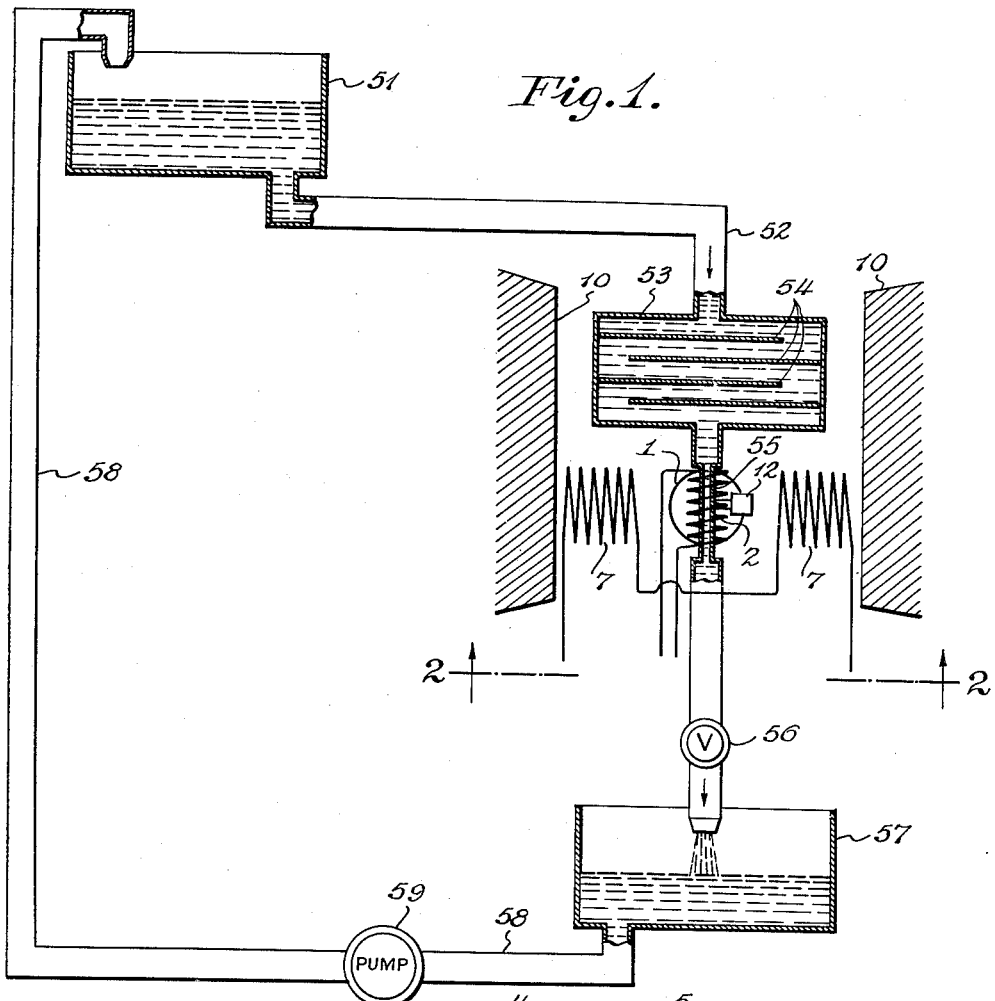
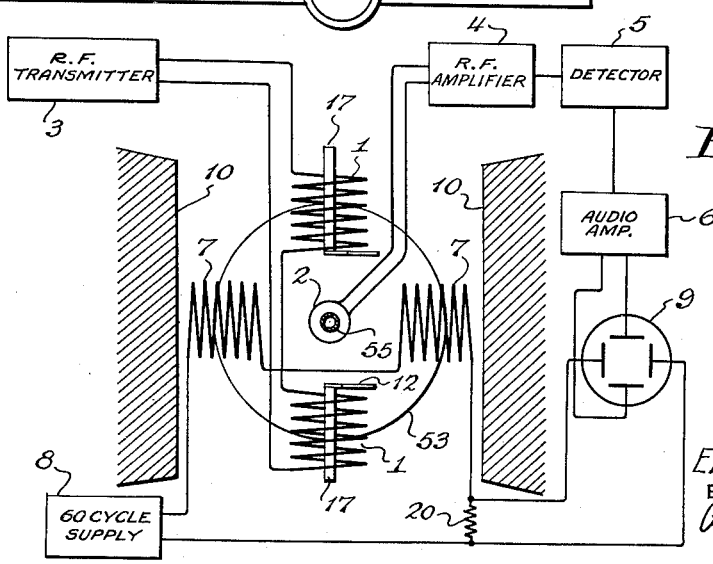
INVENTOR
ELLIOTT C. LEVINTHAL
BY
Paul B. Hunter
ATTORNEY United States Patent Office 2,721,970
Patented Oct. 25, 1955

2,721,970

METHOD AND MEANS FOR IDENTIFYING SUBSTANCES

Elliott C. Levinthal, Menlo Park, Calif., assignor to Varian Associates, San Carlos, Calif., a corporation of California Application January 30, 1952, Serial No. 269,013

22 Claims. (Cl. 324—.5)

This invention relates to the detection and identification of particular kinds of substances, and the invention has reference more specifically to electrical and mechanical methods for accomplishing this result.

In the patent of F. Bloch and W. W. Hansen, U. S. Patent 2,561,489, dated July 24, 1951, entitled "Method and Means for Chemical Analysis by Nuclear Inductions," a method and means is described for obtaining magnetic resonance signals from substances containing portions of atoms having the properties of gyroscopic moment and magnetic moment. In the apparatus of Bloch et al., which embodiment includes a pair of crossed coils and operates on the nuclei of a substance, the signal-to-noise ratio of the nuclear induction signals produced by the precessing nuclei is strongly dependent on the ratio of the time required for the net gyromagnetic moment to decay, known as $T_1$, to the time required for individual precessing gyromagnetic moments to get out of phase, known as $T_2$. In order that a large signal-to-noise ratio be obtained from the Bloch apparatus, it is necessary that the times $T_1$ and $T_2$, also known as relaxation times, be approximately equal to each other. This condition does not usually exist in substances that may be examined by the Bloch apparatus.

The principal object of the present invention is to provide a novel method and means for rapid qualitative and quantitative analysis, through improvement of the method and means invented by Bloch and Hansen, whereby the signal-to-noise ratio of the gyromagnetic resonance signals including nuclear induction signals is not largely dependent on the ratio of the relaxation times.

Another object of this invention is to provide a novel method and means of obtaining large signal-to-noise ratios without the aid of paramagnetic salts in solution, as is often necessary when using the Bloch apparatus.

Still another object of this invention is to provide method and means of obtaining larger gyromagnetic resonance, including nuclear induction, signal-to-noise ratios from solids and gases than are available when using the Bloch apparatus.

Still another object of this invention is to provide means for continuously measuring the gyromagnetic resonance or nuclear induction properties of the products of a chemical processing system.

Still another object of this invention is to provide method and means for measuring the rate of flow of a stream of liquid without the use of a mechanical probe in the liquid.

Other objects and advantages will become apparent from the specification, taken in connection with the accompanying drawings wherein the invention is embodied in concrete form.

In order for the reader to understand the principles of the present invention, it is essential that he be acquainted with the fundamental principles of gyromagnetic resonance in general and, more particularly, nuclear induction. In this connection, attention is called to the above mentioned Patent No. 2,561,489, particularly the part reading from column 1 line 52 to column 8 line 32. Attention is also called to an article by F. Bloch in the Physical Review, vol. 70, pp. 460–474 (October 1946) and to an article by E. E. Salpeter in the Proceedings of the London Physical Society, A, vol. LXIII, pp. 337–349 (1949), especially to pp. 343–344.

It will be seen from these above-cited publications that the relaxation times play an important role in the motion of the precessing nuclei, and thereby in the voltage induced by them. For any given time $T_2$ there is an optimum value of the time $T_1$ for which maximum signals can be induced, namely, when $T_1$ is equal to $T_2$. For other values of $T_1$ smaller signals are induced. When $T_1$ is long compared to $T_2$ there are only very weak disorientation effects, and it is perhaps not obvious why, in the steady-state condition with sinusoidal sweep, there is only a weak precessing moment. The reason lies in the fact, noted in the above mentioned publications, that during part of the sweep cycle the nuclei are "turned over" against the steady field $H_0$. Consider the effect when $H_1$ is turned on suddenly, after equilibrium is established with $H_0$. During the first half sweep, the entire induced gyromagnetic moment $M_0$ precesses and is turned over. Now, the thermal agitation will take some of these turned-over moments and align them again with $H_0$, with the result that during the second half sweep less than $M_0$ will be available to take part in the precession. This process will be repeated at every half cycle, and it is obvious that after a sufficiently long time an equilibrium will be established in which nearly as many nuclear gyromagnetic moments are aligned one way as are aligned the other way, with the result that the net gyromagnetic moment available to produce a signal may be very small.

Bloch et al, in their patent, discuss a method of shortening a long relaxation time $T_1$ by means of catalysts, and thus improving the signal strength. However, the introduction of catalysts into a sample may be objectionable or impractical in some applications. The present invention is designed to improve the signal-to-noise ratio from samples with a relaxation time $T_1$ long compared to $T_2$, without the use of catalysts. It will be noticed, from the preceding paragraph, that such a sample is capable of producing a large signal when the R.-F. field is first turned on, but the signal deteriorates with time. This invention employs a constantly changing sample, so that the part of the sample under examination does not get into equilibrium with the R.-F. field. Although the sample in this invention is not in equilibrium with the R.-F. field, it is desirable that it be in equilibrium with the D.-C. field before R.-F. power is applied to it.

We are now in a position to understand a detailed description of the apparatus of the present invention and the functioning thereof.

In the drawings:

Fig. 1 is a schematic part sectional view of a portion of the apparatus embodying my invention.

Fig. 2 is a view taken along line 2—2 of Fig. 1 looking in the direction of the arrows, and also includes the remainder of the apparatus of this invention.

Similar characters of reference are used in all of the above figures to indicate corresponding parts. Portions of my apparatus that are similar to portions of the Bloch apparatus are given similar reference numerals to those of the patent.

Referring to Fig. 1, reference numeral 51 designates a container for storing the liquid sample to be examined. From the container 51 the liquid flows, due to gravity, through a conduit 52 to a reservoir 53 which is positioned entirely between the pole pieces 10 of a magnet and thus in a D. C. magnetic field. Here the nuclei in the sample are polarized. The reservoir or storage means 53 as shown here is a double-ended bottle with baffles 54 to keep all parts of the liquid moving at substantially the same speed. Alternative forms of reservoir 53 are possible, provided only that said reservoir performs the function of polarizing the sample. For example, it may be a continuation of conduit 52 wound in a coil or helix. The exact shape of reservoir 53 is of no great importance provided it satisfies the following conditions: it must be situated entirely within a D.-C. magnetic field and for optimum performance should contain each successive portion of the liquid for a time at least as long as the relaxation time $T_1$ of the liquid. From reservoir 53 the liquid is conveyed through a portion of tubing 55 which lies within the radio frequency head or probe and where examination by the R.-F. field takes place. Tubing 55 in the probe is shown as of reduced diameter so that the liquid stays within the probe for only a short time. From the probe the liquid passes through a control valve 56 to a discharge container 57. An optional recycling system consisting of pump 59 and conduit 58 returns the liquid to storage container 51.

The location of reservoir 53 and the probe between the pole faces is of prime importance in this invention. Both of these parts must be in regions of strong magnetic field and for best performance the probe should be in a homogeneous part or portion of the field and the reservoir in the strongest part or portion, should these two parts not be the same. The reason for these different requirements is that the D.-C. field which provides the net gyromagnetic moment is not the D.-C. field in the probe but the "memory" of the D.-C. field in the reservoir. The field in the probe, however, determines the Larmor precession frequency, and this should be as well defined as possible.

The velocity of the fluid through tube 55 in the probe should be fast enough so that the time required for a particular part of the sample to pass through the probe is short compared to $T_1$ and approximately equal to $T_2$. However, it has been found experimentally that even moderate flow rates result in a considerable increase in signal over that available when the fluid is not moving. At high rates of flow a limitation is imposed by the capacity of reservoir 53, which must retain the fluid until equilibrium with the D.-C. field occurs.

Fig. 2 shows the apparatus of Fig. 1 as used in a complete system such as employed in the Bloch patent. This apparatus includes D.-C. field sweep coils 7, R.-F. transmitting coils 1 and receiving coil 2 which, in this embodiment of the invention, are built into the probe. Coils 7, supplied from audio frequency source 8 through resistor 20, serve to vary a portion of the field of magnet 10—10 cyclically. Voltage across resistor 20 is supplied to the horizontal plates of cathode ray tube 9. Radio frequency power of the proper frequency to bring about gyromagnetic resonance of the polarized nuclei is supplied by a transmitter 3 to coils 1 extending at right angles to coils 7 and also at right angles to pick-up coil 2. Inside tube 55 the nuclei of the moving liquid precess, inducing a relatively large signal in coil 2 which signal is amplified by amplifier 4, detected by detector 5 and then applied to the vertical deflector plates of cathode ray tube 4. Thus, as the field $H_0$ is varied, the cathode ray spot moves horizontally while, at the same time, the vertical deflection of the spot is a measure of the magnitude of the voltage induced by the precessing nuclei, this resulting voltage curve serving as a means for identifying the fluid and for determining the rate of flow.

A paddle or paddles 12 having contact shafts 17 are used to control leakage fields between coils 1 and 2. As shown in the drawings, coil 1 is actually two coils, one in front and one in back of coil 2. This arrangement makes possible an opening through which tube 55 passes so that this tube 55 is inside coil 2 and parallel to its axis. This entire apparatus, together with reservoir 53, is located between magnet pole faces 10. The remainder of the electronic apparatus is similar to that of Fig. 3 of the Bloch patent.

Modifications of the invention described herein can take other forms. For example, by employing closed containers 51 and 57 the apparatus can be used for gaseous samples as well as liquid ones. Application to powders and to solids in the form of small pellets or crystals, rods, sheets and other forms is also possible through use of suitable conduits. In all these latter cases, the method of catalysts devised by Bloch et al., cannot be used, since the catalyst cannot be dissolved in the samples, and the present invention provides a means for getting large signals. It is also possible to place reservoir 53 and the probe including tubing 55 in separate magnets, provided the test substance is transported rapidly from reservoir 53 to tubing 55.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. For example, this invention is equally applicable to electron resonance and resonance of other types of gyromagnetic bodies or elements, i. e. those bodies possessing the properties of gyroscopic moment and magnetic moment as in the case of nuclei as herein suggested.

What is claimed is:

1. Apparatus for obtaining a relatively large nuclear induction signal from a substance having a long thermal relaxation time comprising means for providing a polarizing magnetic field enveloping the substance, nuclear induction apparatus, means for moving said substance relatively rapidly through the nuclear induction apparatus, and means for measuring the induced signal produced during the time said substance is in said apparatus.

2. Apparatus for obtaining relatively large nuclear induction signals from substances with long thermal relaxation times comprising means for storing such a substance in a steady magnetic field, nuclear induction apparatus, means for transporting said substance from said storage means to said nuclear induction apparatus in a short time, and means for moving said substance through said nuclear induction apparatus.

3. In apparatus for performing chemical analysis by means of nuclear inductions, means for storing a test substance in a steady magnetic field to thereby polarize the nuclei in the substance, means for moving said substance from said storage means through a radiofrequency alternating magnetic field to cause precession of said polarized nuclei at the radio frequency, means for controlling the rate of movement of said substance, and means for detecting the signal induced by the precession of the nuclei in said substance as a result of said radiofrequency field.

4. Apparatus for identifying a fluid containing nuclear moments and measuring its rate of flow, comprising means for storing part of said fluid in a steady magnetic field, nuclear induction apparatus, means for moving said fluid from said storage means through said nuclear induction apparatus, and means for correlating the magnitude of signal induced by said fluid with the rate of flow of said fluid.

5. In apparatus for analyzing a quitity of matter, means for causing the nuclei of atoms of the matter to orient themselves in a predominant direction, varying magnetic field means, actuating and conveying means for moving said oriented nuclei across said varying magnetic field means for causing said oriented nuclei to precess, and means for picking up and detecting the precession signal of said nuclei.

6. Apparatus as defined in claim 5 wherein said actuating and conveying means comprises a pump and conduit means for conveying said matter across said varying magnetic field means, said apparatus comprising an indicator connected to indicate the detected precession signal.

7. Apparatus for obtaining a relatively large nuclear induction signal from precessing nuclei in a substance with a large thermal relaxation time comprising means for setting up a steady magnetic field, a reservoir within a portion of said field, conveyer means for conducting the substance to said reservoir, the steady magnetic field polarizing the nuclei therein, means for superimposing a radio-frequency magnetic field upon a second portion of said steady magnetic field, said conveyor means serving to quickly convey said substance from said reservoir through the second portion of said steady field, the radio frequency magnetic field causing precession of the polarized nuclei at that radio frequency, and pick up means for picking up the signal induced by the precessing nuclei in said substance as a result of its passage through said radio-frequency field.

8. Apparatus as defined in claim 7 wherein said conveyer means comprises a system of piping and a pump for circulating said substance therethrough, said apparatus comprising a detector connected for detecting said induced signal and an indicator for indicating the magnitude of such detected signal.

9. In apparatus for continuously identifying fluid matter, comprising means for setting up a magnetic field, means for circulating said matter into a portion of said field for orienting portions of the atoms of such matter into a predominant direction, said circulating means serving to quickly move the fluid matter continuously to another portion of said field having a superimposed alternating magnetic field component for causing precession of said oriented atom portions.

10. Apparatus for determining the composition of matter comprising means for producing a polarizing magnetic field to polarize the gyromagnetic elements of said matter, means for producing a radio frequency field at right angles to and superimposed on only a portion of the polarizing field, said matter being located in the portion of the polarizing field free of said radio frequency field, and means for transmitting the matter from the free polarizing field portion to the portion of the polarizing field having the radio frequency field superimposed thereon after a predetermined period of time to produce gyromagnetic resonance of said elements.

11. Apparatus for determining the composition of matter comprising means for storing the matter in a steady magnetic field to thereby polarize the gyromagnetic elements of said matter, means for moving the matter from said storage means through a further steady magnetic field, means for providing a radio frequency alternating magnetic field superimposed on said last magnetic field to cause precession of the polarized elements at that radio frequency, means for controlling the rate of movement of the matter, and means for detecting the signal produced by the elements in the matter precessing as a result of said radio frequency field.

12. Apparatus for identifying moving matter containing elements having the properties of magnetic moment and gyroscopic moment and measuring its rate of movement comprising means for storing said matter in a steady magnetic field to thereby polarize said elements, gyromagnetic resonance apparatus, means for moving said matter from said storage means through said gyromagnetic resonance apparatus, and means for correlating the magnitude of the signal produced by the precessing gyromagnetic elements in said matter with the rate of movement of said matter.

13. Apparatus for producing gyromagnetic resonance in matter comprising gyromagnetic elements including means for producing a steady magnetic field, a reservoir within a portion of said field, conveyor means for conveying the matter to said reservoir, the steady magnetic field polarizing the elements therein, means for superimposing a radio frequency magnetic field upon a second portion of the steady magnetic field and at right angles thereto, the conveyor means serving to quickly convey the matter from said reservoir through the second portion of the steady field, the radio frequency magnetic field causing precession of the polarized elements, and pick up means for picking up the signal induced by the precessing elements in the matter as a result of its passage through the radio frequency field.

14. Apparatus for producing nuclear gyromagnetic resonance in matter comprising nuclei including a magnet for producing a polarizing magnetic field, a reservoir within a portion of said field for containing the matter, the nuclei therein being polarized by the polarizing magnetic field, an alternating current carrying coil for superimposing a radio frequency magnetic field upon another portion of the polarizing magnetic field, conveyer means for conveying the matter from said reservoir through the second portion of the polarizing magnetic field, the radio frequency magnetic field causing precession of the nuclei at the particular radio frequency, and pick up means including another coil for picking up the signal induced by the precessing nuclei in the radio frequency field.

15. Apparatus for producing gyromagnetic resonance in moving matter containing portions of atoms having the properties of gyroscopic moment and magnetic moment comprising means for locating said matter in a polarizing magnetic field to polarize the portions of atoms, means for producing a radio frequency field at right angles to and superimposed on a portion only of the polarizing field, said matter being first located in the portion of the polarizing field which is free of said radio frequency field, and means for transmitting the matter from the free polarizing field portion to the portion of the polarizing field having the radio frequency field superimposed thereon after a predetermined period of time to produce gyromagnetic resonance of said elements.

16. Apparatus as claimed in claim 15 wherein said means for producing a radio frequency field comprises a coil adapted to be located within the unidirectional field and a radio frequency oscillator coupled to the coil.

17. Apparatus for producing gyromagnetic resonance in moving matter containing portions of atoms possessing the properties of magnetic moment and gyroscopic moment comprising means for locating said matter in a polarizing magnetic field to polarize the portions of atoms and determine the resonant frequency of said atom portions, means for producing a radio frequency field substantially at right angles to and superimposed on only a portion of the polarizing field, said matter being first located in the portion of the polarizing field which is free of said radio frequency field, means for transmitting the matter from the free polarizing field portion to the portion of the polarizing field having the radio frequency field superimposed thereon to cause said portions to precess at the frequency of said radio frequency field, and means for periodically bringing the frequency of said radio frequency field and the resonant frequency of said atom portions into coincidence.

18. Apparatus as claimed in claim 17 wherein said means for producing a radio frequency field comprises a coil adapted to be located within the polarizing field and a radio frequency oscillator coupled to the coil.

19. Apparatus as claimed in claim 17 wherein said periodic means comprises a coil adapted to be located in the polarizing field and an audio frequency source coupled to the coil.

20. Apparatus for producing gyromagnetic resonance in matter containing portions of atoms having the properties of gyroscopic moment and magnetic moment comprising means for locating the matter in a polarizing magnetic field to thereby polarize the portions of atoms, means for producing a radio frequency field at right angles to and superimposed on only a portion of the polarizing field, said matter being first located in the portion of the polarizing field which is free of said radio frequency field, and means for causing relative movement between said matter and said polarizing field whereby the matter is displaced from said free polarizing field portion into the portion of the polarizing field having the radio frequency field superimposed thereon after a predetermined period of time to thereby produce gyromagnetic resonance of said elements.

21. Apparatus as claimed in claim 20 including magnet means for producing said polarizing magnetic field and wherein said means for producing a radio frequency field includes a coil and radio frequency oscillator coupled to the coil.

22. Apparatus for determining the composition of matter containing elements of atoms having the properties of magnetic moment and gyroscopic moment comprising, means for producing a first unidirectional magnetic field portion for polarizing the gyromagnetic elements of said matter, means for producing a second unidirectional field portion and a radio frequency magnetic field superimposed thereon, and means for moving the matter into said first polarizing magnetic field portion and maintaining it therein for a predetermined period of time to thereby polarize said elements and then moving the matter from the first polarizing field portion into the second polarizing field portion and the radio frequency field within a predetermined time period to cause precession of the elements at said radio frequency.

References Cited in the file of this patent

UNITED STATES PATENTS

| | | |
|---|---|---|
| 2,124,577 | Knerr | July 26, 1938 |
| 2,149,847 | Kolin | Mar. 7, 1939 |
| 2,218,784 | Billstein | Oct. 22, 1940 |
| 2,555,308 | Barnes | June 5, 1951 |
| 2,561,489 | Bloch et al. | July 24, 1951 |
| 2,561,490 | Varian | July 24, 1951 |